J. ALLONAS.

Thrashing Machine.

No. 91,587.

2 Sheets—Sheet 1.

Patented June 22, 1869.

Witnesses:
N. B. Smith
Alex Mahon

Inventor:
Joseph Allonas
by his atty Alex Smith

J. ALLONAS.
Thrashing Machine.
No. 91,587.
2 Sheets—Sheet 2.
Patented June 22, 1869.
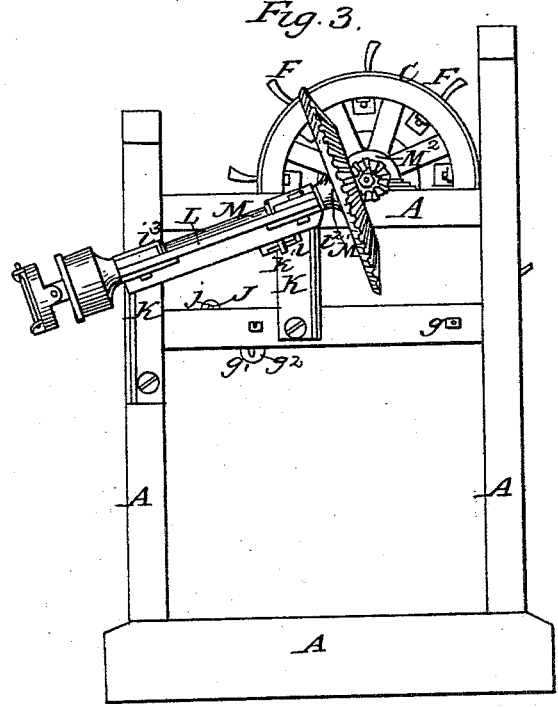
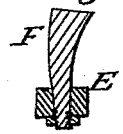
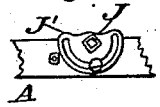
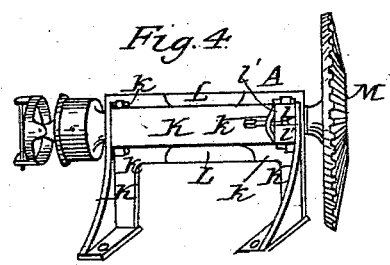
Inventor:
Joseph Allonas
by his atty A. M. Smith

UNITED STATES PATENT OFFICE.

JOSEPH ALLONAS, OF MANSFIELD, OHIO, ASSIGNOR TO CORNELIUS AULTMAN AND HENRY H. TAYLOR.

IMPROVEMENT IN THRASHING-MACHINES.

Specification forming part of Letters Patent No. 91,587, dated June 22, 1869.

*To all whom it may concern:*

Be it known that I, JOSEPH ALLONAS, of Mansfield, in the county of Richland and State of Ohio, have invented a new and useful Improvement in Thrashing-Machines, of which the following is a full, clear, and exact description, reference being had to the accompanying drawing, making a part of this specification, in which—

Figure 1:
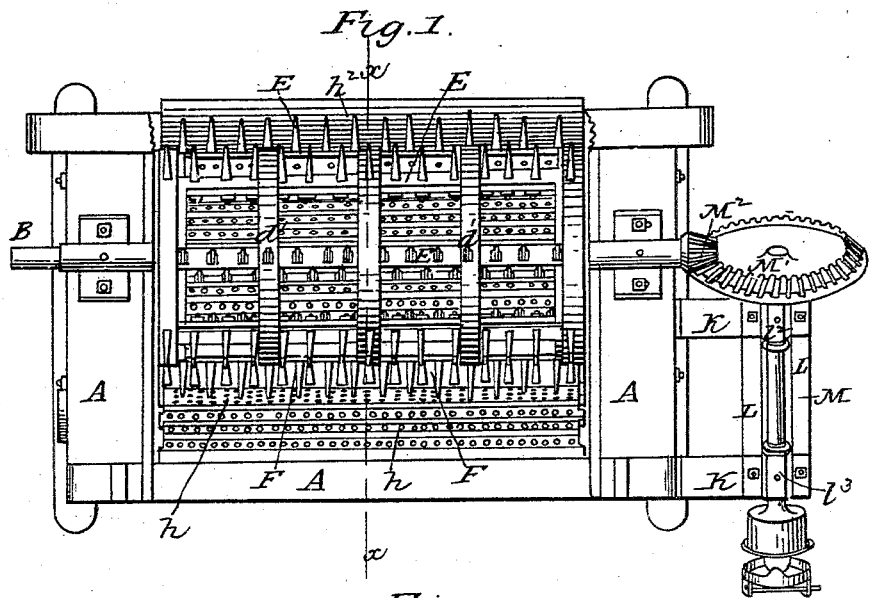
Figure 2:
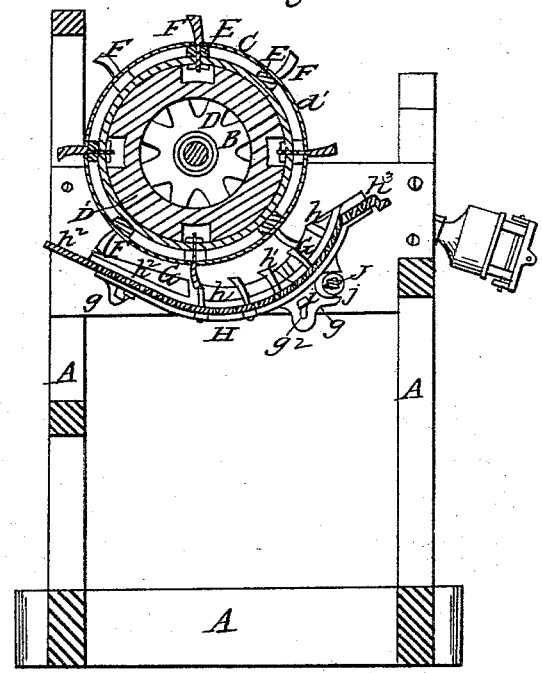

Figure 1 is a plan or top view of the thrashing-cylinder and concave with the cap or cover removed. Fig. 2 is a vertical section through the same in line $x\ x$, Fig. 1. Fig. 3 is a side elevation of the machine. Fig. 4 is a bottom view of the supporting-bracket for the bevel-wheel shaft; and Fig. 5 is a section through one of the cylinder bars and teeth, showing the manner of uniting the same.

Similar letters of reference denote corresponding parts wherever used.

My invention consists in a novel means for effecting an adjustment of the bevel-wheel and shaft, to compensate for the wear of the bevel wheel or pinion, or both; and, secondly, in an improved construction of the devices for effecting the adjustment of the concave relative to the thrashing-cylinder.

In the accompanying drawing, A represents a frame of any usual or suitable construction, in bearings $a\ a$ in the upper part of which is mounted the shaft B of the toothed cylinder C, which is composed of the ends or heads D and intermediate recessed rings or supports D', rings $d$, cylinder-bars E, external bands $d'$, and teeth F, arranged substantially as represented in the drawing, or in any usual or desired manner.

The concave is composed of grooved or flanged supporting-sides G, adapted to receive and to support the toothed and perforated concave bed H. The grooved or flanged sides G have pivoted supports at $g$ in the main frame, upon which, as a center, the concave may be adjusted or vibrated to bring it nearer to or to move it away from the cylinder.

This adjustment is effected by the following means: Vertical flanges $g^1$ formed on the sides G are notched, recessed, or perforated, as shown at $i$, to receive eccentric $j$ on a through-shaft, J, mounted in bearings in frame A. One end of shaft J is provided with a slotted hand-wheel or segment, J', (shown in Fig. 6,) by means of which the operator is enabled to rotate shaft J, and thereby, through eccentrics $j$, operating simultaneously upon the two sides G, for the purpose of moving said concave into the desired relation to the cylinder. A set-screw, passing through a curved slot in wheel or segment J', serves to hold the shaft and concave at the required adjustment.

The flanges $g^1$ of sides G are provided with slots at $g^2$, made in the arc of a circle of which the pivotal support $g$ is the center, and bolts, passing through said slots, serve to give additional support to the concave against backward thrust without interfering with its adjustment, as described.

The perforations in the metal cylinder-bars E, to which the teeth are secured, and also in the concave, if desired, are made or punched in a tapering form, and the shanks of the teeth, or the portion thereof fitting in the same, are made of a corresponding tapering or wedge form, so that, when the teeth are secured thereto by nuts or other usual fastenings, the shanks will wedge firmly into the perforations or sockets in such manner as to prevent all relative movement of the parts.

By this construction the necessity for the usual accuracy of fitting of the teeth is obviated, and any looseness of the teeth resulting from the ordinary wear or strain upon them can be easily remedied by simply tightening the nuts.

K represents a bracket or support for the bevel-wheel shaft, made in any suitable form, and attached to frame A; and L is an adjustable plate or frame mounted thereon, and provided with bearings $l^2\ l^3$, in which is mounted the shaft M of the bevel driving-wheel M'. The plate or frame L is secured to bracket K by bolts passing through slots in said bracket, (represented at $k\ k$,) which permit an endwise movement of the bearing-plate upon the bracket or support. Said plate has formed upon or attached to it a lug or tongue-piece, $l$, which projects through a slot, $l^1$, in the bracket; and the bracket is provided with a set-screw, mounted in a flange, $k'$, or other suitable support, in position to act upon the lug $l$ for effecting the desired adjustment of bearing-plate L and shaft M, such adjustment being found necessary to compensate for wear between the hub of the bevel-wheel and its box or bearing $l^2$, consequent upon the backward thrust of said wheel resulting from its action on the bevel-pinion $M^2$ on the cylinder-shaft.

Parts of the machine not particularly mentioned in the foregoing description may be constructed and arranged in any usual or desired manner.

What I claim as new, and desire to secure by Letters Patent, is—

1. The through-shaft, provided with cams or their equivalent, for simultaneously adjusting the two ends or sides of the concave.

2. The adjustable bearing-plate or frame in which the bevel-wheel shaft is mounted, in combination with means for adjusting the same to compensate for wear.

JOSEPH ALLONAS.

Witnesses:
  WILLIAM WHARF,
  J. B. LITTLE.